United States Patent [19]

Hirano et al.

[11] Patent Number: 5,780,145
[45] Date of Patent: Jul. 14, 1998

[54] FILLER-CONTAINING RESIN COMPOSITION SUITABLE FOR INJECTION MOLDING AND TRANSFER MOLDING

[75] Inventors: Yasuhiro Hirano; Masatsugu Akiba, both of Tsukuba; Yutaka Shiomi; Noriaki Saito, both of Toyonaka, all of Japan

[73] Assignee: Sumitomo Chemical Company, Limited, Osaka, Japan

[21] Appl. No.: 885,196

[22] Filed: Jun. 30, 1997

Related U.S. Application Data

[62] Division of Ser. No. 487,628, Jun. 7, 1995, Pat. No. 5,719,225.

[30] Foreign Application Priority Data

| Jun. 13, 1994 | [JP] | Japan | 6-130621 |
| Jun. 17, 1994 | [JP] | Japan | 6-136049 |
| Aug. 8, 1994 | [JP] | Japan | 6-185998 |

[51] Int. Cl.$^6$ .............. B23B 5/16; B23B 27/38; B23B 27/26
[52] U.S. Cl. .......... 428/323; 428/331; 428/413; 428/473.5; 428/901; 361/746; 361/750
[58] Field of Search .............. 257/788, 78 P, 257/792, 793, 795; 361/746, 750; 428/323, 331, 413, 473.5, 901

[56] References Cited

U.S. PATENT DOCUMENTS

| 5,137,940 | 8/1992 | Tomiyoshi et al. | 523/220 |
| 5,430,330 | 7/1995 | Takahama et al. | 257/788 |

FOREIGN PATENT DOCUMENTS

| 0212225 | 12/1982 | Japan . |
| 0115641 | 6/1985 | Japan . |
| 0096508 | 5/1987 | Japan . |
| 0096568 | 5/1987 | Japan . |
| 0010616 | 1/1988 | Japan . |
| 0261856 | 10/1990 | Japan . |
| 0177450 | 8/1991 | Japan . |
| 0285617 | 10/1992 | Japan . |

OTHER PUBLICATIONS

WPI Abstract Accession No. 92-386501/47 & JP 04285617A (Mitsubishi) 09 Oct. 1992.
WPI Abstract Accession No. 90-364562/49 & JP 02261856A (Toshiba) 24 Oct. 1990.
Japio Abstract 03458211 & JP 03121111A (Mitsubishi) 23 May 1991.

*Primary Examiner*—Peter A. Szekely
*Attorney, Agent, or Firm*—Pillsbury, Madison & Sutro LLP; Cushman, Darby & Cushman Intellectual Property Group

[57] ABSTRACT

A molding resin composition containing, in a resin, a filler comprising a globular powder of which mean particle diameter is not smaller than 0.1 μm and not greater than 1.5 μm (x component), a globular powder of which mean particle diameter is not smaller than 2 μm and not greater than 15 μm (y component) and a globular powder of which mean particle diameter is not smaller than 20 μm and not greater than 70 μm (z component), wherein proportions of the x, y and z components based on the total volume of x, y and z components are not smaller than 10% by volume and not greater than 24% by volume, not smaller than 0.1% by volume and not greater than 36% by volume and not smaller than 57% by volume and not greater than 76% by volume, exhibits an excellent fluidity even when loaded with a high percentage of filler. Further, their cured products are lowered in the moisture absorption and thermal expansion coefficient of which increases result from the resin itself present in the cured product. Further, a semi-conductor package sealed with the resin composition exhibits a high package crack resistance. The resin composition is suitable for use as a sealing material for semi-conductors, and extensively applicable to other uses requiring a high-percentage loading of filler.

25 Claims, No Drawings

FILLER-CONTAINING RESIN COMPOSITION SUITABLE FOR INJECTION MOLDING AND TRANSFER MOLDING

This is a division of application No. 08/487,628, filed Jun. 7, 1995, now U.S. Pat. No. 5,719,225.

FIELD OF THE INVENTION

The present invention relates to a filler-containing resin composition suitable for injection molding and transfer molding, and particularly to an epoxy resin composition useful as a sealing material for electronic parts.

BACKGROUND OF THE INVENTION

Today, sealing of semi-conductors such as LSI, IC, transistor and the like is carried out by the transfer molding of epoxy resin compositions because of their inexpensiveness. Particularly in the recent years, surface mounting of LSI is prevalent and direct dipping of semi-conductor package in solder bath is adopted with increasing frequency at the time of mounting semi-conductors on a substrate. At this time, the sealed package is exposed to a high temperature of 200° C. or above, so that the moisture in the sealed package expands to form cracks. Further, the thermal stress causes a peeling at the interface between elements or metallic frame and sealing material. As its result, moisture or the like penetrates through the cracks or peeled interface into the package to cause defective elements. For this reason, a sealing resin material is required to be low in moisture absorption and high in crack resistance. At present, epoxy compounds such as o-cresol novolac glycidyl ether, tetramethyl-biphenol glycidyl ether and the like are usually mixed with an inorganic filler such as silica or the like and used as the sealing material. As a technical trend of the time, an increase in the content of filler is being studied. For example, by increasing the content of a silica type filler, the moisture absorption due to resin can be decreased, and the difference between thermal expansion coefficients of silicon tip and semi-conductor package can be minimized. By this method, the stress at high temperature can be relaxed, and thereby the occurrence of package crack and peeling can be avoided effectively.

From the viewpoint of the above-mentioned technical trend, it may be thought that to increase the content of silica type filler as possible is effective. Actually, however, there is an upper limit in the content of filler. For example, in case of using a single globular filler, which is close to the ideal mono-dispersed state, the flow of molten epoxy resin sealing material is extremely short when the content of filler is approximately 80% by weight in the epoxy resin sealing material. When the content of the filler is 84% by weight, the fluidity of sealing material substantially disappears, so that an element placed in the die cannot be sealed. In order to avoid this phenomenon, a multi-component filler is usually used. However, when a filler is used at a high filling rate, an increase in the amount of filler by only a few percents can decrease the actual flow to one half or less and make the product unusable.

Generally speaking, when one kind of globular filler is used, the filler cannot be filled in an amount exceeding the hexagonal closest packing (74% by volume). Accordingly, a means of filling small-sized globules in the gaps between large-sized globules is effective for achieving a high filling rate. A number of superior studies for achieving the high filling rate by using a multi-component filler have been published based on this idea. Concretely speaking, the use of two kinds of fillers different from each other in mean particle diameter (JP-B-63-26128), the use of two kinds of fillers one of which is a globular filler and the other of which is a minute globular filler (JP-A-5-239321), the use of three kinds of fillers two of which are globular particles and the third of which is a frag-mental particle (JP-A-5-230284), the use of three kinds of powdery silicas in which the mixing ratio of the three silicas is different from that of the present invention (JP-A-2-261856), etc. can be referred to. As demonstrated by their respective working examples, all of the compositions disclosed in these prior patents show an excellent fluidity in the molten state and an excellent curing moldability when the amount of filler is approximately 80% by weight. If the amount of filler reaches about 90% by weight, however, all of these resin compositions become inferior in flow property and difficult to form into a package.

There may be another means for increasing the content of silica type filler by reducing the viscosity of epoxy resin used. Generally speaking, however, a reduction in the viscosity of epoxy resin brings about a drop in the glass transition temperature (Tg) of cured product. Since dynamic properties of cured product are not good in the temperature range exceeding Tg, a sealing material having a high Tg is demanded in the fields in which the package itself requires a high heat resistance, such as power IC, etc. If a polyfunctional epoxy compound such as o-cresol novolac glycidyl ether or the like is used, Tg can be elevated to 150°–200° C. However, melt viscosity of such sealing material is relatively high, so that a high content of silica filler enough for preventing the package crack cannot be realized. That is, if the content of silica filler is increased to a level enough to prevent the package crack, fluidity of resin composition is greatly deteriorated, due to which molding cannot be practiced. As above, a high content of silica filler and achievement of high Tg have hitherto been in a contradictory relation.

There is known an innovative proposal using a maleimide compound together with three or four kinds of globular silicas as filers (JP-A-4-285617). According to this proposal, the smallest particle has a size of 0.1 μm or less. However, such super-fine particles are easily agglomerated, and the agglomerate behaves as if it were a large-sized particle in the resin composition. Even though this difficulty may be overcome by dispersing the agglomerate to the primary particles, the actual fluidity of the resin composition greatly depends on the method of kneading and the degree of dispersion of filler, and a reproducible result is difficult to obtain.

As another method for avoiding the package crack, a method of elevating heat resistance of resin itself and a method of lowering the stress by a modification using reactive silicone are known. According to these methods, package crack can be prevented even when the amount of filler is 65–80% by weight based on the resin composition. However, the realization of a high heat resistance by elevation of functionality and the lowering of stress by the use of silicone bring about a further increase in the viscosity of resin component, which decreases the degree of freedom in formulation regarding addition of other components or increase in the amount of silica which are necessary for improving performances while maintaining a sufficient fluidity. As above, an improvement in the performances of a sealing material and an increase of its fluidity are also in a contradictory relation.

SUMMARY OF THE INVENTION

It is an object of the present invention to provide a molding resin composition excellent in fluidity and capable of giving a molded product having a low moisture absorption property and a low thermal expansion coefficient.

After extensive studies, the present inventors found that a resin composition prepared by compounding specified fillers at a specified compounding ratio can achieve the object of the present invention. Based on this finding, the present invention was accomplished. Thus, the essentiality of the present invention is as follows:

(1) A molding resin composition containing, in a resin, a filler comprising a globular powder of which mean particle diameter is not smaller than 0.1 μm and not greater than 1.5 μm (x component), a globular powder of which mean particle diameter is not smaller than 2 μm and not greater than 15 μm (y component) and a globular powder of which mean particle diameter is not smaller than 20 μm and not greater than 70 μm (z component), wherein proportions of the x, y and z components based on the total volume of x, y and z components are not smaller than 10% by volume and not greater than 24% by volume, not smaller than 0.1% by volume and not greater than 36% by volume and not smaller than 57% by volume and not greater than 76% by volume, respectively.

(2) A molding resin composition containing, in a resin, a filler comprising a globular powder of which mean particle diameter is not smaller than 0.1 μm and not greater than 1.5 μm (x component), a globular powder of which mean particle diameter is not smaller than 2 μm and not greater than 15 μm (y component), a globular powder of which mean particle diameter is not smaller than 20 μm and not smaller than 70 μm (z component), and a fragmental powder (m component), wherein proportions of the x, y and z components based on the total volume of x, y and z components are not smaller than 10% by volume and not greater than 24% by volume, not smaller than 0.1% by volume and not greater than 36% by volume and not smaller than 57% by volume and not greater than 76% by volume, respectively, and a proportion of the m component is not smaller than 1% by weight and not greater than 30% by weight based on the total weight of x, y, z and m components.

(3) A molding resin composition according to the above-mentioned paragraphs (1) or (2), which contains an epoxy resin of which melt viscosity at 150° C. is lower than 1 poise, a phenolic curing agent, a curing accelerator and a silica type filler comprising x, y, z and m components as indispensable ingredients, wherein the content of the silica type filler is not lower than 83% by weight and not higher than 94% by weight based on the total composition and the spiral flow of the composition is 20 inches or above as measured according to the standard of EMMI-1-66 at 175° C. under a pressure of 70 kg/cm².

(4) A molding resin composition according to the paragraphs (1) or (2), wherein said resin is an epoxy resin of which melt viscosity at 150° C. is not lower than 1 poise and not higher than 20 poises, and cured product of the composition has a glass transition temperature of 150° C. or above.

(5) A molding resin composition according to paragraph (4), wherein the proportion of the filler contained in the resin is not smaller than 60% by weight and not greater than 94% by weight based on the total composition and the spiral flow of the composition is 20 inches or above as measured according to the standard of EMMI-1-66 at 175° C. under a pressure of 70 kg/cm².

(6) A molding resin composition according to paragraph (1) or (2), wherein said resin is a compound having maleimide group.

(7) A molding resin according to paragraph (6), wherein the proportion of the filler contained in the resin is not smaller than 60% by weight and not greater than 94% by weight based on the total weight of the composition and the spiral flow of the composition is 20 inches or above as measured according to the standard of EMMI-1-66 at 175° C. under a pressure of 70 kg/cm².

DETAILED DESCRIPTION OF THE INVENTION

The present invention is described in more detail below.

The globular powders which can be used in the present invention include silica, alumina, aluminum nitride, silicon nitride, silicon carbide, siliceous sand, silica powder, talc, white carbon, aerosil, wollastonite, mica, clay, globular glass, globular metal and the like. From the viewpoint of thermal expansion coefficient and purity, globular powders composed of fused silica powder, crystalline silica powder, alumina powder and the like are preferred.

As for the shape of the globular powder, a substantially globular shape with an aspect ratio of from 1.0 to 1.2 having no sharp edge is enough for the purpose of the invention. Globular powders of which globularity is comparable to that of commercial globular silica powders prepared by flame spraying process or sol-gel process are preferable, and those of which globularity is closer to true sphericity than that of the commercial products are more preferable. When the globulizing treatment is difficult to carry out, a globular powder can be produced also by pulverizing a starting material into a fine powder, adding a binder to the fine powder, and forming the mixture into globular material by a mechano-chemical process.

As for the shape of the fragmental powder, irregular shapes such as edged polyhedrons may be enough for the purpose of the invention. Among the powders of those shapes, fragmental powders of amorphous or crystalline silica obtained by pulverizing natural quartz are preferred, and fused fragmental silica and the like are particularly preferred.

The globular powder used in the present invention consists of three groups, namely components x, y and z. The mean particle diameters of the x, y and z components are not smaller than 0.1 μm and not greater than 1.5 μm, not smaller than 2 μm and not greater than 15 μm, and not smaller than 20 μm and not greater than 70 μm, respectively, and preferably not smaller than 0.1 μm and not greater than 1 μm, not smaller than 2 μm and not greater than 10 μm, and not smaller than 20 μm and not greater than 50 μm, respectively. If the mean particle diameters are out of the above-mentioned ranges, fluidity of the resin composition deteriorates to bring about an undesirable result. In the present invention, narrow dispersions of particle diameters are preferred, and dispersions close to monodispersion are particularly preferred. Accordingly, the x, y and z components are preferably those having been subjected to a sieving treatment for the sake of uniformalizing the particle diameters. As used in the present invention, the term "mean particle diameter" is defined as a particle diameter at a weight accumulation of 50% as determined through a particle size distribution measurement using a particle size distribution measuring apparatus such as laser scattering type particle size distribution meter or the like.

The compounding ratios of the x, y and z components in the globular powder are not smaller than 10% by volume and not greater than 24% by volume, not smaller than 0.1% by volume and not greater than 36% by volume and not smaller than 57% by volume and not greater than 76% by volume, respectively, and preferably not smaller than 10% by volume and not greater than 20% by volume, not smaller than 4% by volume and not greater than 30% by volume and not smaller than 60% by volume and not greater than 76% by volume, respectively, based on the total volume of x, y and z components. If the compounding ratios of x, y and z components are out of the above-mentioned ranges, fluidity of the resin composition deteriorates to bring about an undesirable result.

In the present invention, the term "% by volume" means the volume of components x, y and z each which had been calculated by dividing the weight of components x, y and z each by the true specific gravity thereof.

Generally speaking, the apparent volume of a particulate material having a particle size distribution varies with the method of packing the material into the vessel used in the measurement; and in the case of mixing a plurality of different particulate materials, the apparent volume of the mixture varies before and after the mixing. Accordingly, such "apparent volume" is not used in the present invention for calculating "% by volume" of each component in the assembly of particles.

The fragmental particle (m component) used in the present invention has a mean particle diameter of not smaller than 1 μm and not greater than 70 μm, and preferably not smaller than 1 μm and not greater than 30 μm. The compounding ratio of the fragmental powder (m component) must be not smaller than 1% by weight and not greater than 30% by weight based on the total weight of x, y and z components and the fragmental powder component m. If the amount of m component is smaller than the range prescribed above, the preventive effect on the occurrence of burr and flash (thin films of resin formed from exuded resin) which can be formed in some kinds of resin, in some sealing apparatuses and in some forms of die is small. If the amount of m component is greater than the above-mentioned range, fluidity of resin composition is not good.

Preferably, the filler used in the present invention is sufficiently mixed previously. The mixing can be achieved by using an apparatus using a rotor or air such as mixer, co-kneader and the like, an apparatus for vibrating, shaking or rotating a vessel, and the like. Recommendably, whether a filler has sufficiently been mixed (homogenized) or not is checked by measuring particle size distribution of sample at different positions and examining their substantial equality. If necessary, the filler may be pretreated with a coupling agent or a resin. As the method of the pretreatment, a method of mixing using a solvent, followed by distilling out the solvent, and a method of direct addition of the coupling agent or resin to a filler, followed by a treatment using a mixer can be referred to.

In the present invention, when an epoxy resin of which melt viscosity at 150° C. is lower than 1 poise is used as the resin ingredient, the filler is used preferably in an amount of not smaller than 83% by weight and not larger than 94% by weight and further preferably in an amount of not smaller than 88% by weight and not larger than 94% by weight based on the total composition. If the amount of the filler is smaller than the range mentioned above, the effect of decreasing the moisture absorption and thermal expansion coefficient due to the resin is insufficient. If the amount of the filler is larger than the above-mentioned range, no sufficient fluidity can be achieved.

Concrete examples of the epoxy resin of which melt viscosity at 150° C. is lower than 1 poise include the following:

the glycidyl ether compounds derived from trihydric or higher-hydric phenol compounds such as phloroglucin, tris(4-hydroxyphenyl)methane, 1,1,2,2-tetrakis(4-hydroxyphenyl)ethane, 1,3-bis[bis(4-hydroxyphenyl)methyl]benzene, or 1,4-bis[bis(4-hydroxyphenyl)methyl]benzene and the like, cyclic phenols such as callixallene and the like;

glycidyl ether compounds of dihydric phenol compounds such as Bispshenol A, Bisphenol F, hydroquinone, resorcin, dihydroxynaphthalene, bis(4-hydroxyphenyl)menthane, bis(4-hydroxyphenyl)dicyclopentane, 4,4'-dihydroxybenzophenone, bis(4-hydroxyphenyl) ether, bis(4-hydroxy-3-methylphenyl) ether, bis(3,5-dimethyl-4-hydroxyphenyl) ether, bis(4-hydroxyphenyl) sulfide, bis(4-hydroxy-3-methylphenyl) sulfide, bis(3,5-dimethyl-4-hydroxyphenyl) sulfide, bis(4-hydroxyphenyl) sulfone, bis(4-hydroxy-3-methylphenyl) sulfone, bis(3,5-dimethyl-4-hydroxyphenyl) sulfone, 1,1-bis(4-hydroxyphenyl)cyclohexane, 1,1-bis(4-hydroxy-3-methylphenyl)cyclohexane, 1,1-bis(3,5-dimethyl-4-hydroxyphenyl)cyclohexane, 4,4'-dihydroxybiphenyl, 4,4'-dihydroxy-3,3',5,5'-tetramethylbiphenyl, bis(hydroxynaphthyl)methane, 1,1'-binaphthol, 1,1'-bis(3-t-butyl-6-methyl-4-hydroxyphenyl)butane and the like; glycidyl ether compounds derived from halogenated bisphenols such as Tetrabromobisphenol A and the like; and glycidyl ether compounds of the polyhydric phenol compounds obtained through condensation of a phenol compound and an aromatic carbonyl compound;

amine type epoxy resins derived from p-aminophenol, m-aminophenol, 4-amino-m-cresol, 6-amino-m-cresol, 4,4'-diaminodiphenylmethane, 3,3'-diaminodiphenylmethane, 4,4'-diaminodiphenyl ether, 3,4'-diaminodiphenyl ether, 1,4-bis(4-aminophenoxy)benzene, 1,4-bis(3-aminophenoxy)benzene, 1,3-bis(4-aminophenoxy)benzene, 1,3-bis(3-amino-phenoxy)benzene, 2,2-bis(4-aminophenoxyphenyl)propane, p-phenylenediamine, m-phenylenediamine, 2,4-tolylenediamine, 2,6-tolylenediamine, p-xylylenediamine, m-xylylenediamine, 1,4-cyclohexanebis(methylamine), 1,3-cyclohexanebis(methylamine) and the like;

glycidyl ester compounds derived from aromatic carboxylic acids such as p-oxybenzoic acid, m-oxybenzoic acid, terephthalic acid, isophthalic acid and the like; hydantoin type epoxy compounds derived from 5,5-dimethylhydantoin and the like; alicyclic epoxy resins such as 2,2-bis(3,4-epoxycyclohexyl)propane, 2,2-bis[4-(2,3-epoxypropyl)cyclohexyl]propane, vinylcyclohexene dioxide, 3,4-epoxycyclohexylmethyl-3,4-epoxycyclohexanecarboxylate and the like; aliphatic epoxy resins obtained by oxidizing the double bonds in unsaturated hydrocarbon compounds such as polybutadiene and the like; N,N-diglycidylaniline; and the like.

One or more of these epoxy resins are used in the present invention. Among these epoxy resins, diglycidyl compounds of dihydroxynaphthalene, bis(4-hydroxyphenyl) ether, bis(3,5-dimethyl-4-hydroxyphenyl) sulfide, 1,1-bis(4-hydroxy-3-methylphenyl)cyclohexane, 4,4'-dihydroxybiphenyl, 4,4'-dihydroxy-3,3',5,5'-tetramethylbiphenyl and bis(4-hydroxyphenyl)menthane, bis(4-hydroxyphenyl)dicyclopentane are preferable from the viewpoint of viscosity, adhesive property and lowness in moisture absorption.

When an epoxy resin of which melt viscosity at 150° C. is not lower than 1 poise and not higher than 20 poises is used in the present invention, the amount of the filler can be in the range of not smaller than 50% by weight and not larger than 95% by weight based on the total composition. If the amount of the filler is smaller than the above-mentioned range, known filler formulations can give a sufficient fluidity, so that application of the present invention is meaningless. If the amount of the filler is larger than the above-mentioned range, fluidity of the composition is not good. From the viewpoint of making good use of the low moisture absorption and low thermal expansion coefficient which the filler originally has, the amount of the filler should be preferably in the range of not smaller than 60% by weight and not larger than 94% by weight, and further preferably in the range of not smaller than 83% by weight and not larger than 91% by weight. When melt viscosity of the epoxy resin is 1 poise or higher, a sealed article of semi-conductor exhibiting excellent properties after cure while retaining a high Tg can be obtained. When melt viscosity of the epoxy resin is higher than 20 poises, it is difficult to add the filler in an amount enough for preventing package crack or the components necessary for realizing high performances with maintaining a sufficient fluidity, whereby the degree of freeness in formulation decreases.

As such an epoxy resin, polyfunctional epoxy resins having two or more epoxy groups in one molecule can be referred to. Concrete examples of such epoxy resins include polyphenol type or polynaphthol type novolac resins obtained by reacting an aldehyde compound such as formaldehyde and the like with a phenol compound such as phenol, o-cresol, catechol and the like or a naphthol compound such as hydroxynaphthalene, dihydroxynaphthalene and the like; a trityl skeleton-containing polyphenol compound obtained by condensing a phenol compound such as phenol, o-cresol, methyl-t-butylphenol or the like with an aromatic aldehyde compound such as hydroxybenzaldehyde or the like; polyaralkylphenol resins and polyaralkylnaphthol resins obtained by reacting xylylene dichloride or the like with a phenol compound such as phenol, o-cresol, catechol or a naphthol compound such as hydroxynaphthalene, dihydroxynaphthalene or the like; alicyclic hydrocarbon-containing polyphenol resins and polynaphthol resins obtained by reacting a phenol compound such as phenol, o-cresol, catechol or the like or a naphthol compound such as hydroxynaphthalene, dihydroxynaphthalene or the like with an unsaturated alicyclic hydrocarbon such as dicyclopentadiene, limonene or the like; and glycidyl ether compounds of polyhydric phenols and polyhydric naphthols obtained by condensing a phenol compound or a naphthol compound with an aromatic carbonyl compound; and glycidyl ether compounds derived from a tri- or higher-hydric phenol compound having a fundamental skeleton of phloroglucin, tris(4-hydroxyphenyl)methane, 1,1,2,2-tetrakis-(4-hydroxyphenyl)ethane, 1,3-bis|bis(4-hydroxyphenyl)methyl|benzene, 1,4-bis|bis(4-hydroxyphenyl)methyl|benzene or the like; and glycidyl ether compounds derived from cyclic phenol compounds such as callixallene or the like. One or more of these epoxy resins are used in the present invention. Among these epoxy resins, preferred are the polyphenol type novolac resins, trityl skeleton-containing polyphenol compounds, polyaralkylphenol resins, alicyclic hydrocarbon-containing polyphenol resins or the glycidyl ether compounds of polyhydric phenol compounds and polyhydric naphthol compounds obtained by a condensation reaction of an aromatic carbonyl compound with phenol compounds.

When the resin composition of the present invention contains an epoxy resin of which melt viscosity at 150° C. is not lower than 1 poise and not higher than 20 poises as said resin ingredient, an epoxy resin of which melt viscosity at 150° C. is lower than 1 poise may be added to the composition, if desired, in addition to the above-mentioned epoxy resin for the purpose of regulating viscosity and improving properties of the epoxy resin composition.

As the epoxy curing agent used in the present invention, known curing agents can be used. Examples of the curing agent include polyphenol type and polynaphthol type novolac resins obtained by reacting an aldehyde compound such as formaldehyde or the like with a phenol compound such as phenol, o-cresol, catechol or the like or a naphthol compound such as hydroxynaphthalene, dihydroxynaphthalene or the like; polyaralkylphenol resins and polyaralkylnaphthol resins obtained by reacting xylylene chloride or the like with a phenol compound such as phenol, o-cresol, catechol or the like or a naphthol compound such as hydroxynaphthalene, dihydroxynaphthalene or the like; alicyclic hydrocarbon-containing polyphenol resins and polynaphthol resins obtained by reacting a phenol compound such as phenol, o-cresol, catechol or the like or a naphthol compound such as hydroxynaphthalene, dihydroxynaphthalene or the like with an unsaturated alicyclic hydrocarbon such as dicyclopentadiene, limonene or the like; tri- or higher-hydric phenol compounds having a fundamental skeleton of phloroglucin, tris(4-hydroxyphenyl)methane, 1,1,2,2-tetrakis(4-hydroxyphenyl)ethane, 1,3-bis|bis(4-hydroxyphenyl)methyl|benzene, 1,4-bis|bis(4-hydroxyphenyl)methyl|benzene or the like; cyclic phenols such as callixallene or the like; dihydric phenol compounds such as Bisphenol A, Bisphenol F, hydroquinone, resorcin, dihydroxynaphthalene, bis(4-hydroxyphenyl)ethane, bis(4-hydroxyphenyl)propane, bis(4-hydroxyphenyl)butane, bis(4-hydroxyphenyl)pentane, bis(4-hydroxyphenyl)hexane, 1,3,3-trimethyl-1-m-hydroxyphenylindan-5- or -7-ol, bis(4-hydroxyphenyl)menthane, bis(4-hydroxyphenyl)dicyclopentane, 4,4'-dihydroxybenzophenone, bis(4-hydroxyphenyl) ether, bis(4-hydroxy-3-methylphenyl) ether, bis(3,5-dimethyl-4-hydroxyphenyl) ether, bis(4-hydroxyphenyl) sulfide, bis(4-hydroxy-3-methylphenyl) sulfide, bis(3,5-dimethyl-4-hydroxyphenyl) sulfide, bis(4-hydroxyphenyl) sulfone, bis(4-hydroxy-3-methylphenyl) sulfone, bis(3,5-dimethyl-4-hydroxyphenyl) sulfone, 1,1-bis(4-hydroxyphenyl)cyclohexane, 1,1-bis(4-hydroxy-3-methylphenyl)cyclohexane, 1,1-bis(3,5-dimethyl-4-hydroxyphenyl)cyclohexane, 4,4'-dihydroxybiphenyl, 4,4'-dihydroxy-3,3',5,5'-tetramethylbiphenyl bis (hydroxynaphthyl)methane, 1,1'-binaphthol, 1,1'-bis(3-t-butyl-6-methyl-4-hydroxyphenyl)butane and the like; halogenated bisphenols such as Tetrabromobisphenol A and the like; polyhydric phenols obtained by conden- sation reaction of a phenol compound and an aromatic carbonyl compound; polycarboxylic acids such as maleic acid, phthalic acid, nasic acid, methyl-tetrahydrophthalic acid, methyl-nasic acid and the like and anhydrides thereof; polyamine compounds such as diaminodiphenylmethane, diaminodiphenyl sulfone, diaminodiphenyl ether, phenylenediamine, diaminodicyclohexylmethane, xylylene diamine, tolylene diamine, diaminocyclohexane, dichlorodiaminodiphenylmethane (including isomers), ethylene diamine, hexamethylenediamine and the like; and active hydrogen-containing compounds which can react with epoxy group such as dicyandiamide, tetramethylguanidine and the like. Among these compounds, phenol type novolac resins, phenol type aralkyl resins, naphthol type aralkyl resins, alicyclic hydrocarbon-containing polyphenol resins and alicyclic hydrocarbon-containing polynaphthol resins are preferred from the viewpoint of curing performance and moisture resistance.

In the resin composition of the present invention, the compounding ratio of the curing agent to the epoxy resin is preferably in the range of from 0.7 equivalent to 1.2 equivalents, and further preferably one equivalent, per equivalent of epoxy resin. If the compounding ratio is far distant from one equivalent, moisture resistance and curing performance deteriorate to bring about undesirable results.

Next, the method for heat-curing the epoxy resin composition of the invention is mentioned below. The composition can be cured easily in a short period of time by the use of a curing accelerator. Particularly when the composition is used as a sealing material, the use of a curing accelerator is indispensably necessary. Non-limitative examples of such catalysts (curing accelerators) include organic phosphine compounds such as triphenylphosphine, tri-4-methylphenylphosphine, tri-4-methoxyphenylphosphine, tributylphosphine, trioctylphosphine, tri-2-cyanoethyl-phosphine and the like; organic phosphonium salts such as tetraphenylphosphonium tetraphenylborate and the like; tertiary amines such as tributylamine, triethylamine, 1,8-diazabicyclo(5,4,0)undecene-7, triamylamine and the like; quaternary ammonium salts such as benzyltrimethylammonium chloride, benzyltrimethylammonium hydroxide, triethylammonium tetraphenylborate and the like; imidazoles; boron trifluoride complexes; transition metal acetylacetonates; and radical initiators such as benzoyl peroxide, di-t-butyl peroxide, dicumyl peroxide, lauroyl peroxide, acetyl peroxide, methyl ethyl ketone peroxide, cyclohexanone peroxide, t-butyl hydroperoxide, azobisisobutyronitrile and the like. Among these curing accelerators, particularly preferred are organic phosphine compounds and imidazoles and salts thereof (concretely speaking, tetraphenylphosphonium tetraphenyl-borate, 4-methylimidazole tetraphenylborate and the like), and triethylammonium tetraphenylborate.

The curing accelerator is used in an amount of from 0.1 to 10 parts by weight and preferably from 0.5 part to 3 parts by weight per 100 parts by weight of epoxy resin. If the amount of curing accelerator is smaller than the above-mentioned range, the molding is difficult to complete in a short period of time, which reduced the productivity of molded article per unit time. If the amount of curing accelerator is larger than the above-mentioned range, the curability at high temperature excessively increases, which brings about troubles such as difficulty in operation and decrease in storage stability of compound.

If desired, a known polymerization inhibitor may be used in combination with the above-mentioned ingredients for the purpose of controlling the curing velocity. Examples of said polymerization inhibitor include phenol compounds such as 2,6-di-t-butyl-4-methylphenol, 2,2'-methylenebis(4-ethyl-6-t-butylphenol), 4,4'-methylenebis(2,6-di-t-butylphenol), 4,4'-thiobis(3-methyl-6-t-butylphenol), hydroquinone monomethyl ether and the like; polyhydric phenol compounds such as hydroquinone, catechol, p-t-butylcatechol, 2,5-di-t-butylhydroquinone, methylhydroquinone, t-butylhydroquinone, pyrogallol and the like; phenothiazine compounds such as phenothiazine, benzophenothiazine, acetamidophenothiazine and the like; and N-nitrosamine compounds such as N-nitrosodiphenylamine, N-nitrosodimethylamine and the like.

When a compound having maleimide group is used in the present invention, the filler can be used in an amount of not smaller than 50% by weight and not larger than 95% by weight based on the total composition. If the amount of said compound having maleimide group is smaller than the above-mentioned range, sufficient fluidity can be achieved according to known formulation of filler, so that application of the present invention is meaningless. If the amount of the compound exceeds the above-mentioned range, fluidity is not good. From the viewpoint of making good use of the low moisture absorption and low thermal expansion coefficient which the filler originally has, the amount of the filler is preferably in the range of not smaller than 60% by weight and not larger than 94% by weight, and preferably not smaller than 81% by weight and not larger than 92% by weight.

Concrete examples of the maleimide compound used in the present invention are as follows:

aromatic monomaleimides such as phenylmaleimide, methylphenylmaleimide, maleimido-benzoic acid, hydroxyphenylmaleimide, chlorophenylmaleimide, bromophenylmaleimide, tribromophenylmaleimide, phenoxyphenyl-maleimide, maleimidophenoxyphenylmenthane, maleimidophenoxy-phenyldicyclopentane and the like; aliphatic monomaleimides such as octylmaleimide, cyclohexylmaleimide and the like;

aromatic bismaleimides having two benzene rings in one molecule such as N,N'-4,4'-diaminodiphenylmethane-bismaleimide, N,N'-bis(4-amino-3,5-dimethylphenyl) methanebismaleimide, N,N'-bis(4-amino-3-ethyl-5-methylphenyl)methanebismaleimide, N,N'-bis(4-amino-3,5-diethylphenyl)methanebismaleimide, N,N'-4,4'-diaminodiphenylether-bismaleimide, N,N'-3,4'-diaminodiphenylether-bismaleimide, N,N'-4,4'-diaminodiphenylsulfide-bismaleimide, N,N'-4,4'-diaminodiphenylsulfone-bismaleimide and the like;

aromatic bismaleimides having three or more benzene rings in one molecule such as N,N'-2,2'-bis|4-(4-aminothio-phenoxy)phenyl|propane-bismaleimide, N,N' -4,4'-bis(4-aminophenoxy)benzophenone-bismaleimide, N,N'-1,3-bis(4,4'-aminophenoxy) benzene-bismaleimide, N,N'-1,3-bis(3,3'-aminophenoxy)benzene-bismaleimide, N,N'-1,4-bis(4, 4'-aminophenoxy)benzene-bismaleimide, N,N'-1,4-bis (3,3'-aminophenoxy)benzene-bismaleimide, N,N'-4,4'-bis(4-aminophenoxy)biphenyl-bismaleimide, N,N'-4, 4'-bis(3-aminophenoxy)biphenyl-bismaleimide, N,N'-4,4'-bis(4-aminophenoxy)-3,3'5,5'-tetramethylbiphenyl-bismaleimide, N,N'-4,4'-bis(3-aminophenoxy)-3,3',5,5'-tetramethylbiphenyl-bismaleimide, N,N'-1,1-bis|4-(4-aminophenoxy) phenyl]-cyclohexane-bismaleimide, N,N'-1-phenyl-1, 1-bis(4-(4-aminophenoxy)phenyl|methane-bismaleimide, N,N'-1,4-bis|bis(4-aminophenyl) methyl|benzene-bismaleimide, N,N'-1,1-bis|4-(4-aminophenoxy)phenyl]cyclohexane-bismaleimide, N,N'-2,2-bis|4-(4-aminophenoxy)phenyl|methane-bismaleimide, N,N'-2,2-bis|4-(4-aminophenoxy) phenyl|propane-bismaleimide, N,N'-2,2-bis|4-(3-aminophenoxy)phenyl|propane-bismaleimide, N,N'-2, 2-bis|3-methyl-4-(aminophenoxy)phenyl|propane-bismaleimide, N,N'-2,2-bis|4-(4-aminophenoxy) phenyl|propane-bismaleimide, N,N'-1,1,1,3,3,3-hexafluoro-2,2-bis|4-trifluoromethyl-4-(aminophenoxy)phenyl]propane-bismaleimide, N,N'-1,1,1,3,3,3-hexafluoro-2,2-bis|4-(4-aminophenoxy) phenyl]propane-bismaleimide, N,N'-1,1-bis|4-(4-aminophenoxy)-3-t-butyl-6-methylphenyl|butane-bismaleimide, N,N'-1,1-bis|4-(4-aminophenoxy)-3-t- butyl-6-methylphenyl|propane-bismaleimide, N,N'-1,1-bis|4-(4-aminopaminophenoxy)-3-t-butyl-6-methylphenyl|ethane-bismaleimide, N,N'-1,1-bis|4-(4-aminophenoxy)-3-t-butyl-6-methylphenyl|methane-bismaleimide, N,N'-1,1,1,3,3,3-hexafluoro-2,2-bis|4-(4-aminophenoxy)-3-t-butyl-6-methylphenyl|propane-bismaleimide and the like;

aromatic maleimides having three or more maleimide groups in one molecule such as tris|4-(4-maleimidophenoxy)-phenyl|methane, 1,1,2,2-tetrakis(4-maleimidophenyl)ethane, 1,1,2,2-tetrakis(4-maleimidophenylmethyl)benzene, aniline novolac resin prepared from aniline and formaldehyde, aralkylaniline resin prepared from aniline and a xylene derivative such as α,α'-xylene dichloride, and the like;

naphthalene ring-containing aromatic bismaleimides such as N,N'-diaminonaphthalene-bismaleimide, N,N'-2,7-bis(4,4'-aminophenoxy)naphthalene-bismaleimide, N,N'-2,7-bis(3,3'-aminophenoxy)naphthalene-bismaleimide, N,N'-2,7-bis(3,4'-aminophenoxy)naphthalene-bismaleimide, N,N'-1,6-bis(4,4'-aminophenoxy)naphthalene-bismaleimide, N,N'-1,6-bis(3,3'-aminophenoxy)naphthalene-bismaleimide, N,N'-1,6-bis(3,4'-aminophenoxy)naphthalene and the like;

alicyclic skeleton-containing bismaleimides such as N,N'-bis|4-(4-aminophenoxy)phenyl|menthane-bismaleimide, N,N'-bis|2-(4-aminophenoxy)phenyl|methane-bismaleimide, N,N'-bis|4-(3-aminophenoxy)phenyl|menthane-bismaleimide, N,N'-bis|2-(3-aminophenoxy)phenyl|menthane-bismaleimide, N,N'-bis|4-(4-aminophenoxy)-3-methylphenyl|menthane-bismaleimide, N,N'-bis(4-(4-aminophenoxy)-3,5-dimethylphenyl|menthane-bismaleimide, N,N'-bis|4-(4-aminophenoxy)-3-butyl-6-methylphenyl|menthane-bismaleimide, N,N'-bis|4-(4-amino-5-methylphenoxy)-3-methylphenyl|menthane-bismaleimide, N,N'-bis|4-(4-amino-5-methylphenoxy)-3,5-dimethylphenyl|methane-bismaleimide, N,N'-bis|4-(4-amino-5-methylphenoxy)-3-butyl-6-methylphenyl|menthane-bismaleimide, N,N'-bis|2-(4-aminophenoxy)-3-methylphenyl|menthane-bismaleimide, N,N'-bis|4-(4-aminophenoxy)phenyl|dicyclopentane-bismaleimide, N,N'-bis|2-(4-aminophenoxy)phenyl|dicyclopentane-bismaleimide, N,N'-[2-(4-aminophenoxy)phenyl]-|4-(4-aminophenoxy)phenyl]-dicyclopentane-bismaleimide, N,N'-bis|4-(3-aminophenoxy)-phenyl|dicyclopentane-bismaleimide, N,N'-bis|2-(3-aminophenoxy)phenyl|-dicyclopentane-bismaleimide, N,N'-|2-(3-aminophenoxy)phenyl]-|4-(3-aminophenoxy)phenyl|dicyclopentane-bismaleimide, N,N'-bis|4-(4-aminophenoxy)-3-methylphenyl|-dicyclopentane-bismaleimide, N,N'-bis|4-(4-aminophenoxy)-3,5-dimethylphenyl]-dicyclopentane-bismaleimide, N,N'-bis|4-(4-aminophenoxy)-3-butyl-6-methylphenyl|dicyclopentane-bismaleimide, N,N'-bis|4-(4-amino-5-methylphenoxy)-3-methylphenyl|dicyclopentane-bismaleimide, N,N'-bis|4-(4-amino-5-methylphenoxy)-3,5-dimethylphenyl|dicyclopentane-bismaleimide, N,N'-bis|4-(4-amino-5-methylphenoxy)-3-butyl-6-methylphenyl|dicyclopentane-bismaleimide, N,N'-bis|2-(4 -aminophenoxy)-3-methylphenyl|-dicyclopentane-bismaleimide, N,N'-|2-(4-aminophenoxy)-3-methylphenyl|-|4-(4-aminophenoxy)-3-methylphenyl|-dicyclopentane-bismaleimide, and the like; and silicone type bismaleimides such as N,N'-ω,ω-bis(2-aminoethyl)polydimethylsiloxane-bismaleimide, N,N'-ω,ω-bis(3-aminopropyl)polydimethylsiloxane-bismaleimide, N,N'-ω,ω-bis(2-aminopropyl)polydiphenylsiloxane-bismaleimide, N,N'-bis(4-aminophenyl)polydimethylsiloxane-bismaleimide, N,N'-ω,ω-bis(aminophenoxyphenylpropyl)polydimethylsiloxane-bismaleimide, N,N'-ω,ω'-bis(aminophenylpropyl)polydimethyl-siloxane-bismaleimide, N,N'-1,3-bis(3-aminopropyl)-1,1,3,3-tetramethyldisiloxane-bismaleimide, N,N'-1,3-bis(3-aminopropyl)-1,1,3,3-tetraphenyldisiloxane-bismaleimide, and the like.

Among these bismaleimide compounds, N,N'-4,4'-diaminodiphenylmethane-bismaleimide and the ether type bismaleimides such as N,N'-2,7-bis(4-aminophenoxy) naphthalene-bismaleimide,- N,N'-1,1-bis|4-(4-aminophenoxy)-3-t-butyl-6-methylphenyl|butane-bismaleimide, N,N'-2,2-bis|4-(4-aminophenoxy)phenyl|-propane-bismaleimide, N,N'-4,4'-bis|3-aminophenoxy) biphenyl-bismaleimide, N,N'-bis|4-(4-aminophenoxy) phenyl|menthane-bismaleimide and the like are preferred because of their excellence in general balance between properties of cured product, inexpensiveness, etc.

To the imide resin used in the present invention, the above-mentioned epoxy resin of which melt viscosity is lower than 1 poise and the epoxy resin of which melt viscosity is not lower than 1 poise and not higher than 20 poises may both be added for the purpose of controlling viscosity and improving properties, if desired.

The compounding ratio of the epoxy curing agent to the epoxy resin is preferably from 0.7 equivalent to 1.2 equivalents and preferably one equivalent per equivalent of epoxy resin. If the compounding ratio is extremely distant from one equivalent, moisture resistance, curing characteristics, etc. deteriorate to bring about an undesirable result.

The epoxy resin is added to the maleimide compound in an amount of from 2 to 900 parts by weight and preferably from 5 to 200 parts by weight, per 100 parts by weight of the maleimide compound. If the amount of the epoxy resin is smaller than the above-mentioned range, the maleimide compound and the filler are not easily kneaded uniformly, which decreases the adhesion of the compound to frame and semi-conductor elements. If the amount of the epoxy resin is larger than the above-mentioned range, Tg of cured product decreases, and no sufficient heat resistance can be achieved.

Next, the method for heat-curing the imide resin composition of the present invention will be mentioned. The imide resin composition of the present invention can be cured by the use of a curing accelerator easily in a short period of time. Particularly when the imide resin composition of the invention is used as a sealing material, the use of a curing accelerator is indispensably necessary. Non-limitative examples of such catalysts (curing accelerators) include organic phosphine compounds such as triphenylphosphine, tri-4-methylphenylphosphine, tri-4-methoxyphenylphosphine, tributylphosphine, trioctylphosphine, tri-2-cyanoethyl-phosphine and the like; organic phosphonium salts such as tetraphenylphosphonium tetraphenylborate and the like; tertiary amines such as tributylamine, triethylamine, 1,8-diazabicyclo(5,4,0) undecene-7, triamylamine and the like; quaternary ammonium salts such as benzyltrimethylammonium chloride, benzyltrimethylammonium hydroxide, triethylammonium tetraphenylborate and the like; imidazoles; boron trifluoride complexes; transition metal acetylacetonates; and radical initiators such as benzoyl peroxide, di-t-butyl peroxide, dicumyl peroxide, lauroyl peroxide, acetyl peroxide, methyl ethyl ketone peroxideperoxide, t-bue peroxide, t-butyl hydroperoxide, azobisisobutyronitrile and the like. Among these curing accelerators, particularly preferred are organic phosphine compounds and imidazoles and salts thereof (concretely speaking, tetraphenylphosphonium tetraphenylborate, 4-methylimidazole tetraphenylborate and the like), and triethylammonium tetraphenylborate.

The curing accelerator is used in an amount of from 0.1 to 10 parts by weight and preferably from 0.3 part to 5 parts by weight per 100 parts by weight of imide resin. If the amount of curing accelerator is smaller than the above-mentioned range, the molding is difficult to complete in a short period of time, which reduced the productivity of molded article per unit time. If the amount of curing accelerator is larger than the above-mentioned range, the curability at high temperature excessively increases, which causes troubles such as difficulty in operation and decrease in storage stability of compound.

If desired, a known polymerization inhibitor may be used in combination with the above-mentioned ingredients for the purpose of controlling the curing velocity. Examples of said polymerization inhibitor include phenol compounds such as 2,6-di-t-butyl-4-methylphenol, 2,2'-methylenebis(4-ethyl-6-t-butylphenol), 4,4'-methylenebis(2,6-di-t-butylphenol), 4,4'-thiobis(3-methyl-6-t-butylphenol), hydroquinone monomethyl ether and the like; polyhydric phenol compounds such as hydroquinone, catechol, p-t-butylcatechol, 2,5-di-t-butyl-hydroquinone, methylhydroquinone, t-butylhydroquinone, pyrogallol and the like; phenothiazine compounds such as phenothiazine, benzophenothiazine, acetamidophenothiazine and the like; and N-nitrosamine compounds such as N-nitrosodiphenylamine, N-nitrosodimethylamine and the like.

If desired, an alkenyl group-containing compound may be added to the imide resin composition of the present invention for the purpose of obtaining a sealing material having good moldability without lowering Tg of the composition or for providing reactive sites for silicone modification. Concrete examples of said alkenyl group-containing compound include polyphenol type or polynaphthol type novolac resins obtained by reacting a phenol compound such as phenol, o-cresol, catechol or the like or a naphthol compound such as hydroxynaphthalene, dihydroxynaphthalene or the like with an aldehyde compound such as formaldehyde or the like; trityl skeleton-containing polyphenol compounds obtained by a condensation reaction of a phenol compound such as phenol, o-cresol, methyl-t-butylphenol or the like and an aromatic aldehyde compound such as hydroxybenzaldehyde or the like; polyaralkylphenol resins and polyaralkylnaphthol resins obtained by reacting xylylene dichloride or the like with a phenol compound such as phenol, o-cresol, catechol or the like or a naphthol compound such as hydroxynaphthalene, dihydroxynaphthalene or the like; alicyclic hydrocarbon-containing polyphenol resins and polynaphthol resins obtained by reacting a phenol compound such as phenol, o-cresol, catechol or the like or a naphthol compound such as hydroxynaphthalene, dihydroxynaphthalene or the like with an unsaturated alicyclic hydrocarbon compound such as dicyclopentadiene, limonene or the like; and the compounds prepared by partially allyl-etherifying the hydroxyl groups of polyphenol compounds such as polyhydric phenols, polyhydric naphthols or the like obtained through a condensation reaction of a phenol compound or a naphthol compound and an aromatic carbonyl compound. The content of the allyl ether is from 2 to 80% based on the hydroxyl group of the polyphenol compound.

To the imide resin composition of the present invention, an amino compound may be added, if desired, for the purpose of improving strengths and toughness. Examples of said amino compound include the compounds in which the maleimido group of the above-mentioned concrete examples of maleimide compound is replaced with an amino group. For example, 4,4'-diaminodiphenylmethane can be referred to in place of the N,N'-4,4'-diaminodiphenylmethane-bismaleimide.

As the resins which can be used in the present invention, thermoplastic resins and thermosetting resins can be referred to. Among these resins, semiconductor-sealing resins are preferred because they can be loaded with a high percentage of filler, and thermosetting resins, particularly epoxy resin and imide resin, are further preferred.

As the resins other than epoxy resin and imide resin which can be used in the present invention, the following can be referred to.

Thus, as thermosetting resins, resins having unsaturated group such as acrylic acid group, methacrylic acid group, vinylbenzyl group and the like; resins having isocyanato group; resins obtained by Diels alder reaction such as the resin prepared from benzocyclobutene and an unsaturated bond-containing compound, and the like; resins obtained by reacting a silicon hydride-containing siloxane with an unsaturated bond-containing compound in the presence of a platinum catalyst; and the like can be referred to.

As thermoplastic resins, heat-resistant thermoplastic resins such as totally aromatic polyesters, polyamide-imides, polyimides, polyetheromides, polyester-sulfones, polyetherether ketones, and the like can be referred to.

Apart from the above, a demolding agent such as natural waxes, synthetic waxes, higher aliphatic acids and metallic salts thereof, paraffins and the like; a colorant such as carbon black and the like; a surface-treating agent such as silane coupler and the like; may be added to the resin composition of the present invention, if desired. Further, a flame retardant such as antimony trioxide, a phosphorus compound, a brominated epoxy resin or the like may also be added. From the viewpoint of flame-retarding effect, brominated epoxy resin is particularly effective.

Further, an elastomer may be added or previously reacted for the purpose of lowering stress. Concrete examples of the elastomer include additive type and reaction type elastomers such as polybutadiene, butadiene-acrylonitrile copolymer, silicone rubber, silicone oil and the like.

The resin composition obtained in the above-mentioned manner can be made into a compound by melting and homogenizing it with usual mixing or kneading means such as roll, co-kneader or the like.

In sealing an electronic part such as semi-conductor by the use of the resin composition of the present invention, the composition is cured and molded according to hitherto known molding process such as transfer molding, compression molding, injection molding or the like.

As one index indicating the fluidity of molding resin composition, "spiral flow" can be referred to. A spiral flow of 20 inches or more means that the tip of cured product of a molding resin composition has reached a point 20 inches or farther distant from the starting point when measured according to the standard of EMMI-1-66 at 175° C. under a pressure of 70 kg/cm$^2$, provided that EMMI is abbreviation from Epoxy Molding Materials Institute, which is a standard of American Plastic Industry Association. If spiral flow is smaller than 20 inches, there occurs a problem of incomplete loading of compound into die so far as the general transfer molding process is adopted, which brings about a difficulty that a molded article can be obtained only by using an excessive amount of compound for every shot and carrying out the molding at a high pressure. Further, if spiral flow is small, the number of articles in one die which can be molded in one shot decreases, which leads to a decrease in productivity per unit time or an industrial disadvantage. On the other hand, if spiral flow is great, the number of articles per shot increases and, in addition, special resin ingredients and modifying agents necessary for improving performances, which cannot be used under usual conditions because they increase the viscosity, become usable, and the scope of adoptable formulation becomes broader. As above, in a molding resin composition, ensuring a sufficient spiral flow gives a great merit to practical use.

EXAMPLES

Next, examples of the present invention are shown below in no limitative way. In the examples, the methods for evaluation of molded products were as mentioned below.

Spiral flow: Spiral flow was measured according to the standard of EMMI-1-66 at 175° C. under a pressure of 70 kg/cm$^2$; the result is presented in term of inches.

Glass transition temperature (Tg) and thermal expansion coefficient: Measured with Thermo-mechanical Analyzer (SHIMADZU DT-30).

Bending strength: Measured according to JIS K-6911 with Instron All-purpose Material Testing Machine (SHIMADZU IS-10T).

Water absorption: In a constant temperature-constant humidity bath (TABAI PR-2), a package sealing a simulative element was examined for change in weight at 85° C./85% RH.

Crack resistance test: Eight packages each mounting a simulative element were allowed to absorb water at 85° C., at 85% RH, for 72 hours, after which the packages were immediately dipped in a solder bath kept at 240° C. for 30 seconds. The occurrence of package crack was examined.

Moldability: Regarding moldability, appearance of molded article, including flashes and surface irregularities, was evaluated and expressed in three stages (○, Δ and x). ○ means that there is no practical problem, Δ means that the article is inferior to ○ although it is usable, and x means that the article is practically unusable.

Referential Examples 1–20

Using globular silicas and fragmental fused silicas of which mean particle diameters and properties were as shown in Table 1, compounding was carried out at the ratios (% by volume) shown in Tables 2 and 3, and the compounded mixtures thus obtained were thoroughly homogenized to obtain the fillers of Referential Examples 1–20. The particle size distribution was measured with Laser Scattering Particle Size Distribution Meter (Master Sizer MS-20, manufactured by Malvern Co.), and the particle diameter at a weight accumulation of 50% was taken as mean particle diameter shown in Table 1.

TABLE 1

| Silica | Mean particle diameter (μm) | Specific surface area (m$^2$/g) | Electro-conductivity (μS/cm) | Fe$^{++}$ ion content (ppm) | Na$^+$ ion (ppm) | Cl$^-$ ion (ppm) | Maker |
|---|---|---|---|---|---|---|---|
| Globular silica-1 | 0.4 | 15 or more | 13 or less | 30 or less | 5 or less | 5 or less | Tatsumori K.K. |
| Globular silica-2 | 0.7 | 14 | 10 or less | 30 or less | 5 or less | 5 or less | Tokuyama Soda K.K. |
| Globular silica-3 | 4.9 | 3 | 5 or less | 30 or less | 2 or less | 2 or less | Nippon Kagaku K.K. |
| Globular silica-4 | 8.0 | 1.8 | 3 or less | 20 or less | 2 or less | 2 or less | Tokuyama Soda K.K. |
| Globular silica-5 | 10.7 | 1.5 | 3 or less | 15 or less | 5 or less | 2 or less | Denki Kagaku K.K. |
| Globular silica-6 | 28.7 | 0.5 | 3 or less | 20 or less | 2 or less | 2 or less | Tokuyama Soda K.K. |
| Globular silica-7 | 40.4 | 0.5 | 3 or less | 20 or less | 2 or less | 2 or less | Tokuyama Soda K.K. |
| Fragmental fused silica-1 | 5.3 | 5.6 | 2.8 | 15 or less | 4 or less | 2 or less | Denki Kagaku K.K. |
| Fragmental fused silica-2 | 13.0 | 5.0 or less | 1.8 | 10 or less | 2 or less | 1 or less | Denki Kagaku K.K. |

TABLE 2

| | Formulation Referential Example | | | | | | | | | |
|---|---|---|---|---|---|---|---|---|---|---|
| Silica | 1 | 2 | 3 | 4 | 5 | 6 | 7 | 8 | 9 | 10 |
| Globular silica-1 | — | — | — | — | — | 12% | — | 13.5% | 10.8% | 10.8% |
| Globular silica-2 | 16% | 18% | 20% | 15% | 18% | — | 16.2% | — | — | — |
| Globular silica-3 | — | — | — | — | — | 20% | — | 25.2% | 18% | 18% |

TABLE 2-continued

| Silica | Formulation Referential Example | | | | | | | | | |
|---|---|---|---|---|---|---|---|---|---|---|
| | 1 | 2 | 3 | 4 | 5 | 6 | 7 | 8 | 9 | 10 |
| Globular silica-4 | 12% | 10% | 10% | 24% | 8% | — | 9% | — | — | — |
| Globular silica-6 | 72% | 72% | 70% | — | — | — | 64.8% | 51.3% | — | — |
| Globular silica-7 | — | — | — | 61% | 74% | 68% | — | — | 61.2% | 61.2% |
| Fragmental fused silica-1 | — | — | — | — | — | — | 10% | 10% | 10% | — |
| Fragmental fused silica-2 | — | — | — | — | — | — | — | — | — | 10% |

TABLE 3

| Silica | Formulation Referential Example | | | | | | | | | |
|---|---|---|---|---|---|---|---|---|---|---|
| | 11 | 12 | 13 | 14 | 15 | 16 | 17 | 18 | 19 | 20 |
| Globular silica-1 | — | — | — | — | — | — | — | — | — | — |
| Globular silica-2 | 3% | 5% | 8% | 8% | 12% | 14% | 8% | 28% | 28% | 5% |
| Globular silica-3 | — | — | — | — | — | — | — | — | — | — |
| Globular silica-4 | 10% | 19% | 28% | 11% | 4% | 5% | 42% | 10% | 20% | 2% |
| Globular silica-6 | 87% | 76% | 64% | 81% | — | — | 50% | 62% | 52% | — |
| Globular silica-7 | — | — | — | — | 84% | 81% | — | — | — | 93% |
| Fragmental fused silica-1 | — | — | — | — | — | — | — | — | — | — |
| Fragmental fused silica-2 | — | — | — | — | — | — | — | — | — | — |

Examples 1–10 and Comparative Examples 1–10

As an epoxy resin, 4,4'-hydroxy-3,3',5,5'-tetramethylbiphenyl glycidyl ether (manufactured by Sumitomo Chemical Industry Co. Ltd.) having a melt viscosity of 0.1 poise/150° C. was used. As a curing agent, phenol novolac (trade name Tamanol 759, manufactured by Arakawa Kagaku Co.) was used. As a curing accelerator, triphenylphosphine was used. As a demolding agent, carnauba wax was used. As a coupler (coupling agent), SH-6040 (trade name, manufactured by Toray Dow Corning Silicone Co.) was used. Each of the fillers of Referential Examples 1–20 was compounded with the above-mentioned ingredients according to the formulations (g) shown in Tables 4 and 5, heated and kneaded on rolls, and molded by means of a press. Then, the molded product was post-cured in an oven at 180° C. for 5 hours to obtain a cured product. On the cured product thus obtained, glass transition temperature, water absorption, bending strength and moldability were measured. The results are shown in Tables 4 and 5.

TABLE 4

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| | Formulation | | | | | | | | | |
| Filler (Ref. Ex. 1) | 1399.5 | — | — | — | — | — | — | — | — | — |
| Filler (Ref. Ex. 2) | — | 1399.5 | — | — | — | — | — | — | — | — |
| Filler (Ref. Ex. 3) | — | — | 1399.5 | — | — | — | — | — | — | — |
| Filler (Ref. Ex. 4) | — | — | — | 1399.5 | — | — | — | — | — | — |
| Filler (Ref. Ex. 5) | — | — | — | — | 1399.5 | — | — | — | — | — |
| Filler (Ref. Ex. 6) | — | — | — | — | — | 1399.5 | — | — | — | — |
| Filler (Ref. Ex. 7) | — | — | — | — | — | — | 1399.5 | — | — | — |
| Filler (Ref. Ex. 8) | — | — | — | — | — | — | — | 1399.5 | — | — |
| Filler (Ref. Ex. 9) | — | — | — | — | — | — | — | — | 1399.5 | — |
| Filler (Ref. Ex. 10) | — | — | — | — | — | — | — | — | — | 1399.5 |
| Epoxy resin | 100 | 100 | 100 | 100 | 100 | 100 | 100 | 100 | 100 | 100 |
| Curing Agent | 55.5 | 55.5 | 55.5 | 55.5 | 55.5 | 55.5 | 55.5 | 55.5 | 55.5 | 55.5 |

TABLE 4-continued

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Accelerator | 1.5 | 1.5 | 1.5 | 1.5 | 1.5 | 1.5 | 1.5 | 1.5 | 1.5 | 1.5 |
| Coupler | 2 | 2 | 2 | 2 | 2 | 2 | 2 | 2 | 2 | 2 |
| Demolding agent | 1.78 | 1.78 | 1.78 | 1.78 | 1.78 | 1.78 | 1.78 | 1.78 | 1.78 | 1.78 |
| Properties | | | | | | | | | | |
| Moldability | Δ | Δ | ○ | ○ | Δ | Δ | ○ | ○ | ○ | ○ |
| Spiral flow (inches) | 31.5 | 32.0 | 32.2 | 36.1 | 31.1 | 40.5 | 26.5 | 30.5 | 42.8 | 40.5 |
| Tg (°C.) | 126 | 125 | 124 | 125 | 125 | 131 | 129 | 127 | 127 | 125 |
| Heat expansion coeff. (×10$^{5}$ °C.$^{-1}$) | 0.63 | 0.56 | 0.63 | 0.61 | 0.63 | 0.64 | 0.67 | 0.62 | 0.62 | 0.65 |
| Bending strength (kg/mm$^2$) | 12.2 | 11.9 | 13.4 | 13.1 | 10.7 | 14.6 | 10.1 | 13.3 | 15.0 | 12.9 |
| Water absorption (72 h) (%) | 0.155 | 0.162 | 0.162 | 0.158 | 0.171 | 0.150 | 0.177 | 0.152 | 0.130 | 0.164 |
| Crack resistance test | 0/8 | 0/8 | 0/8 | 0/8 | 0/8 | 0/8 | 0/8 | 0/8 | 0/8 | 0/8 |

TABLE 5

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| Formulation | | | | | | | | | | |
| Filler (Ref. Ex. 11) | 1399.5 | — | — | — | — | — | — | — | — | — |
| Filler (Ref. Ex. 12) | — | 1399.5 | — | — | — | — | — | — | — | — |
| Filler (Ref. Ex. 13) | — | — | 1399.5 | — | — | — | — | — | — | — |
| Filler (Ref. Ex. 14) | — | — | — | 1399.5 | — | — | — | — | — | — |
| Filler (Ref. Ex. 15) | — | — | — | — | 1399.5 | — | — | — | — | — |
| Filler (Ref. Ex. 16) | — | — | — | — | — | 1399.5 | — | — | — | — |
| Filler (Ref. Ex. 17) | — | — | — | — | — | — | 1399.5 | — | — | — |
| Filler (Ref. Ex. 18) | — | — | — | — | — | — | — | 1399.5 | — | — |
| Filler (Ref. Ex. 19) | — | — | — | — | — | — | — | — | 1.399.5 | — |
| Filler (Ref. Ex. 20) | — | — | — | — | — | — | — | — | — | 1788 |
| Epoxy resin | 100 | 100 | 100 | 100 | 100 | 100 | 100 | 100 | 100 | 100 |
| Curing Agent | 55.5 | 55.5 | 55.5 | 55.5 | 55.5 | 55.5 | 55.5 | 55.5 | 55.5 | 55.5 |
| Accelerator | 1.5 | 1.5 | 1.5 | 1.5 | 1.5 | 1.5 | 1.5 | 1.5 | 1.5 | 1.5 |
| Coupler | 2 | 2 | 2 | 2 | 2 | 2 | 2 | 2 | 2 | 2 |
| Demolding agent | 1.78 | 1.78 | 1.78 | 1.78 | 1.78 | 1.78 | 1.78 | 1.78 | 1.78 | 1.78 |
| Properties | | | | | | | | | | |
| Moldability | × | × | × | × | × | × | × | × | × | × |
| Spiral flow (inches) | 0.6 | 3.5 | 18.5 | 17.0 | 15.8 | 17.9 | 15.0 | 18.5 | 15.0 | 1 |

The epoxy resin compositions of the present invention exhibit an excellent fluidity and can be loaded with a high percentage of filler. Accordingly, their cured products are lowered in the moisture absorption and thermal expansion coefficient of which increases result from the resin itself present in the cured product.

Referential Examples 21–27

The globular silicas and fragmental fused silicas of which mean particle diameters were as shown in Table 1 were compounded at the compounding ratios (% by volume) shown in Table 6 and thoroughly homogenized to obtain the fillers of Referential Examples 21–27.

TABLE 6

| Formulation | Ref. Ex. 21 | Ref. Ex. 22 | Ref. Ex. 23 | Ref. Ex. 24 | Ref. Ex. 25 | Ref. Ex. 26 | Ref. Ex. 27 |
|---|---|---|---|---|---|---|---|
| Globular silica-1 | 12% | 10.8% | 10.8% | — | — | — | — |
| Globular silica-2 | — | — | — | — | 8% | 28% | 28% |
| Globular silica-3 | 20% | 18% | 18% | — | — | — | — |
| Gldbular silica-4 | — | — | — | — | 11% | 10% | 20% |
| Globular silica-6 | — | — | — | 80% | 81% | 62% | 52% |
| Globular silica-7 | 68% | 61.2% | 61.2% | — | — | — | — |
| Fragmental fused silica-1 | — | 10% | — | — | — | — | — |
| Fragmental fused silica-2 | — | — | 10% | 20% | — | — | — |

Examples 11–15 and Comparative Examples 11–15

As epoxy resins, o-cresol novolac glycidyl ether (trade name Sumiepoxy ESCN-195, melt viscosity 2.6 poises/150° C., hydrolyzable chlorine content 180 ppm, manufactured by Sumitomo Chemical Industry Co., Ltd.; in Tables 7 and 8, referred to as "Epoxy 1") and a polyphenol glycidyl ether obtained by condensation of a phenol compound and hydroxybenzaldehyde (trade name Sumiepoxy TMH-574, melt viscosity 3.3 poises/150° C., hydrolyzable chlorine content 400 ppm, manufactured by Sumitomo Chemical Industry Co., Ltd.; in Tables 7 and 8, referred to as "Epoxy 2") were used. As a curing agent, phenol novolac (trade name Tamanol 759, manufactured by Arakawa Kagaku Co.) was used. As a curing accelerator, triphenylphosphine was used. As a demolding agent, carnauba wax was used. As a coupler, SH-6040 (trade name, manufactured by Toray Dow Corning Silicone Co.) was used. Each of the fillers of Referential Examples 21–27 was compounded with the above-mentioned ingredients according to the compounding ratios (g) shown in Tables 7 and 8, heated and kneaded on rolls, and molded by means of press. Further, the molded product was post-cured in an oven at 180° C. for 5 hours to obtain a cured product. The cured product thus obtained was examined on glass transition temperature, water absorption, bending strength and moldability. The results are shown in Tables 7 and 8.

TABLE 7

| | Ex. 11 | Ex. 12 | Ex. 13 | Ex. 14 | Ex. 15 |
|---|---|---|---|---|---|
| Amt. of filler (% by wt.) | 87.6% | 84.6% | 87.6% | 87.6% | 87.6% |
| | | Formulation | | | |
| Filler (Ref. Ex. 21) | 1129.9 | — | — | — | — |
| Filler (Ref. Ex. 22) | — | 873.1 | 1129.9 | — | 1094.9 |
| Filler (Ref. Ex. 23) | — | — | — | 1129.9 | — |
| Epoxy-1 | 100 | 100 | 100 | 100 | — |
| Epoxy-2 | — | — | — | — | 100 |
| Curing agent | 54.1 | 54.1 | 54.1 | 54.1 | 49.3 |
| Accelerator | 1.5 | 1.5 | 1.5 | 1.5 | 1.5 |
| Coupler | 2.3 | 2.2 | 2.3 | 2.2 | 2.3 |
| Demolding agent | 1.7 | 1.7 | 1.7 | 1.7 | 1.7 |
| | | Properties | | | |
| Moldability | Δ | ○ | ○ | ○ | ○ |
| Spiral flow (inches) | 23.2 | 35.1 | 22.5 | 23.5 | 31 |
| Tg (°C.) | 163 | 163 | 160 | 163 | 181 |
| Heat expansion coeff. (°C.$^{-1}$) | 0.91 ×10$^{-5}$ | 1.1 ×10$^{-5}$ | 0.83 ×10$^{-5}$ | 0.85 ×10$^{-5}$ | 1.09 ×10$^{-5}$ |
| Bending strength (kg/mm$^2$) | 11.3 | 13.9 | 15.2 | 15.5 | 13.4 |
| Water absorption (72 h)(%) | 0.158 | 0.193 | 0.156 | 0.155 | 0.218 |
| Crack resistance test | 0/8 | 0/8 | 0/8 | 0/8 | 0/8 |

TABLE 8

| | Comp. Ex. 11 | Comp. Ex. 12 | Comp. Ex. 13 | Comp. Ex. 14 | Comp. Ex. 15 |
|---|---|---|---|---|---|
| Amt. of filler (% by wt.) | 82.5% | 75.4% | 87.6% | 87.6% | 87.6% |
| | | Formulation | | | |
| Filler (Ref. Ex. 24) | 752.4 | 474 | — | — | — |
| Filler (Ref. Ex. 25) | — | — | 1129.9 | — | — |
| Filler (Ref. Ex. 26) | — | — | — | 1129.9 | — |
| Filler (Ref. Ex. 27) | — | — | — | — | 1.129.9 |
| Epoxy-1 | 100 | — | 100 | 100 | 100 |
| Epoxy-2 | — | 100 | — | — | — |

TABLE 8-continued

|  | Comp. Ex. 11 | Comp. Ex. 12 | Comp. Ex. 13 | Comp. Ex. 14 | Comp. Ex. 15 |
|---|---|---|---|---|---|
| Curing agent | 54.1 | 49.3 | 54.1 | 54.1 | 54.1 |
| Accelerator | 1.5 | 1.5 | 1.5 | 1.5 | 1.5 |
| Coupling agent | 2.2 | 2.2 | 2.3 | 2.3 | 2.3 |
| Demolding agent | 1.6 | 1.6 | 1.7 | 1.7 | 1.7 |
| Properties |  |  |  |  |  |
| Moldability | ○ | ○ | x | x | x |
| Spiral flow (inches) | 19.5 | 41.9 | 7 | 8 | 6 |
| Tg (°C.) | 160 | 176 |  | Unmoldable |  |
| Heat expansion coeff. (°C.$^{-1}$) | $1.3 \times 10^{-5}$ | $2.2 \times 10^{-5}$ |  | " |  |
| Bending strength (kg/mm$^2$) | 12.4 | 13.3 |  | " |  |
| Water absorption (72 h)(%) | 0.219 | 0.349 |  | Unmoldable |  |
| Crack resistance test | 5/8 | 8/8 |  | " |  |

The molding epoxy resin compositions of the present invention exhibit an excellent fluidity even when loaded with a high percentage of filler. Further, they are lowered in the moisture absorption and thermal expansion coefficient of which increases result from the resin itself present in the cured product, and their glass transition temperatures (Tg) are 150° C. or above.

Referential Examples 28–34

Globular silicas and fragmental fused silicas of which mean particle diameters were as shown in Table 1 were compounded at compounding ratios (g) shown in Table 9 and thoroughly homogenized to obtain the fillers of Referential Examples 28–34.

TABLE 9

| Formulation | Ref. Ex. 28 | Ref. Ex. 29 | Ref. Ex. 30 | Ref. Ex. 31 | Ref. Ex. 32 | Ref. Ex. 33 | Ref. Ex. 34 |
|---|---|---|---|---|---|---|---|
| Globular silica-1 | 12% | 10.8% | — | — | — | — | — |
| Globular silica-2 | — | — | — | 8% | 30% | 25% | 8% |
| Globular silica-3 | 20% | 18% | — | — | — | — | — |
| Globular silica-4 | — | — | — | 11% | 20% | — | 22% |
| Globular silica-5 | — | — | — | — | — | 21% | — |
| Globular silica-6 | — | — | 80% | 81% | 50% | 54% | 70% |
| Globular silica-7 | 68% | 61.2% | — | — | — | — | — |
| Fragmental fused silica-1 | — | — | — | — | — | — | — |
| Fragmental fused silica-2 | — | 10% | 20% | — | — | — | — |

Examples 16–25 and Comparative Examples 16–20

As epoxy resins, o-cresol novolac glycidyl ether (trade name Sumiepoxy ESCN-195, melt viscosity 2.6 poises/150° C., hydrolyzable chlorine content 180 ppm, manufactured by Sumitomo Chemical Industry Co., Ltd.; in Tables 10, 11 and 12, referred to as "Epoxy 1") was used. As imides, N,N'-4,4'-diaminodiphenylmethane-bismaleimide (trade name Bestlex BH-180, melt viscosity 2.4 poises/175° C., manufactured by Sumitomo Chemical Industry Co., Ltd.; in Tables 10, 11 and 12, referred to as "Imide 1") and N,N'-bis[4-(4-(aminophenoxy)phenyl]menthane-bismaleimide (trade name Bestlex MPD, melt viscosity 7.3 poises/175° C., manufactured by Sumitomo Chemical Industry Co., Ltd.; in Tables 10, 11 and 12, referred to as "Imide 2") were used. As a curing agent, phenol novolac (trade name Tamanol 759, manufactured by Arakawa Kagaku Co.) was used. As a curing accelerator, triphenylphosphine (in Tables 10, 11 and 12 referred to as "Catalyst 1") and tetraphenylphosphonium tetraphenylborate (in Tables 10, 11 and 12, referred to as "Catalyst 2") were used. As a demolding agent, carnauba wax was used. As a coupler, SH-6040 (trade name, manufactured by Toray Dow Corning Silicone Co.; in Tables 10, 11 and 12, referred to as "Coupler 1") and KBM-573 (trade name, manufactured by Shin'Etsu Kagaku Kogyo Co.; in Tables 10, 11 and 12, referred to as "Coupler 2") were used. Each of the fillers of eferential Examples 28–34 was compounded with the above-mentioned ingredients according to the compounding ratios (g) shown in Tables 10 and 11, heated and kneaded on rolls, and molded by means of press. Further, the molded product was post-cured in an oven at 200° C. for 5 hours to obtain a cured product. The cured product thus obtained was examined on glass transition temperature, water absorption, bending strength and moldability. The results are shown in Tables 10, 11 and 12.

TABLE 10

|  | Ex. 16 | Ex. 17 | Ex. 18 | Ex. 19 | Ex. 20 |
|---|---|---|---|---|---|
| Amt. of filler (% by wt.) | 87.4% | 87.4% | 84.3% | 87.6% | 84.3% |
| Formulation | | | | | |
| Filler (Ref. Ex. 28) | 2824.8 | — | — | 2824.8 | 2182.8 |
| Filler (Ref. Ex. 29) | — | 2824.8 | 2182.8 | — | — |
| Imide-1 | 231.1 | 231.1 | 231.1 | — | — |
| Imide-2 | — | — | — | 231.1 | 231.1 |
| Epoxy-1 | 100 | 100 | 100 | 100 | 100 |
| Curing agent | 54.1 | 54.1 | 54.1 | 54.1 | 54.1 |
| Catalyst-1 | 1.54 | 1.54 | 1.54 | 1.54 | 1.54 |
| Catalyst-1 | 7.7 | 7.7 | 7.7 | 7.7 | 7.7 |
| Coupler-1 | 4.46 | 4.46 | 4.31 | 4.46 | 4.31 |
| Coupler-2 | 4.46 | 4.46 | 4.31 | 4.46 | 4.31 |
| Demolding agent | 3.1 | 3.1 | 3 | 3.1 | 3 |
| Properties | | | | | |
| Moldability | ○ | ○ | ○ | ○ | ○ |
| Spiral flow (inches) | 28 | 26.5 | 42.2 | 20.2 | 28.4 |
| Tg (°C.) | 231 | 226 | 236 | 222 | 220 |
| Heat expansion coeff. (°C.$^{-1}$) | $0.72 \times 10^{-5}$ | $0.71 \times 10^{-5}$ | $0.77 \times 10^{-5}$ | $0.7 \times 10^{-5}$ | $0.85 \times 10^{-5}$ |
| Bending strength (kg/mm$^2$) | 18.8 | 16.3 | 15 | 18.1 | 17.8 |
| Water absorption (72 h) (%) | 0.302 | 0.311 | 0.382 | 0.270 | 0.312 |
| Crack resistance test | 0/8 | 0/8 | 0/8 | 0/8 | 0/8 |

TABLE 11

|  | Ex. 21 | Ex. 22 | Ex. 23 | Ex. 24 | Ex. 25 | Comp. Ex. 16 |
|---|---|---|---|---|---|---|
| Amt. of filler (% by wt.) | 81.2% | 87.4% | 84.3% | 81.2% | 90.0% | 75.1% |
| Formulation | | | | | | |
| Filler (Ref. Ex. 28) | 1754.8 | — | — | — | — | — |
| Filler (Ref. Ex. 29) | — | 2824.8 | 2182.8 | 1754.8 | 3661.4 | — |
| Filler (Ref. Ex. 30) | — | — | — | — | — | 1218.1 |
| Imide-1 | — | — | — | — | 231.1 | — |
| Imide-2 | 231.1 | 231.1 | 231.1 | 231.1 | — | 231.1 |
| Epoxy-1 | 100 | 100 | 100 | 100 | 100 | 100 |
| Curing agent | 54.1 | 54.1 | 54.1 | 54.1 | 54.1 | 54.1 |
| Catalyst-1 | 1.54 | 1.54 | 1.54 | 1.54 | 1.54 | 1.54 |
| Catalyst-2 | 7.7 | 7.7 | 7.7 | 7.7 | 7.7 | 7.7 |
| Coupler-1 | 4.16 | 4.46 | 4.31 | 4.16 | 4.59 | 3.85 |
| Coupler-2 | 4.16 | 4.46 | 4.31 | 4.16 | 4.59 | 3.85 |
| Demolding agent | 2.9 | 3.1 | 3 | 2.9 | 3.2 | 2.7 |
| Properties | | | | | | |
| Moldability | ○ | ○ | ○ | ○ | ○ | ○ |
| Spiral flow (inches) | 37.1 | 21.2 | 37.5 | 39.5 | 20.2 | 40 |
| Tg (°C.) | 222 | 221 | 221 | 223 | 231 | 230 |
| Heat expansion coeff. (°C.$^{-1}$) | $1.01 \times 10^{-5}$ | $0.67 \times 10^{-5}$ | $0.98 \times 10^{-5}$ | $1.11 \times 10^{-5}$ | $0.56 \times 10^{-5}$ | $1.85 \times 10^{-5}$ |
| Bending strength (kg/mm$^2$) | 19.3 | 15.8 | 15.3 | 16.4 | 16.9 | 13.1 |
| Water absorption (72 h) (%) | 0.342 | 0.270 | 0.312 | 0.357 | 0.268 | 0.418 |
| Crack resistance test | 0/8 | 0/8 | 0/8 | 0/8 | 0/8 | 4/8 |

TABLE 12

|  | Comp. Ex. 17 | Comp. Ex. 18 | Comp. Ex. 19 | Comp. Ex. 20 |
|---|---|---|---|---|
| Amt. of filler (% by wt.) | 87.4% | 87.4% | 87.4% | 87.4% |
| Formulation | | | | |
| Filler (Ref. Ex. 31) | 2824.8 | — | — | — |
| Filler (Ref. Ex. 32) | — | 2824.8 | — | — |
| Filler (Ref. Ex. 33) | — | — | 2824.8 | — |
| Filler (Ref. Ex. 34) | — | — | — | 2824.8 |
| Imide-1 | 231.1 | 231.1 | 231.1 | 231.1 |
| Imide-2 | — | — | — | — |
| Epoxy-1 | 100 | 100 | 100 | 100 |

TABLE 12-continued

|  | Comp. Ex. 17 | Comp. Ex. 18 | Comp. Ex. 19 | Comp. Ex. 20 |
|---|---|---|---|---|
| Curing agent | 54.1 | 54.1 | 54.1 | 54.1 |
| Catalyst-1 | 1.54 | 1.54 | 1.54 | 1.54 |
| Catalyst-2 | 7.7 | 7.7 | 7.7 | 7.7 |
| Coupler-1 | 4.46 | 4.46 | 4.46 | 4.46 |
| Coupler-2 | 4.46 | 4.46 | 4.46 | 4.46 |
| Demolding agent | 3.1 | 3.1 | 3.1 | 3.1 |
| Properties | | | | |
| Moldability | x | x | x | x |
| Spiral flow (inches) | 16.5 | 0 | 9 | 6.5 |
| Crack resistance test | Difficult to mold | | | |

The molding imide resin compositions of the present invention exhibit an excellent fluidity even when loaded with a high percentage of filler. Further, their cured products are lowered in the moisture absorption and thermal expansion coefficient of which increase result from the resin itself present in the cured product, and their glass transition temperatures (Tg) are 200° C. or above.

The resin compositions of the present invention exhibit an excellent fluidity even when loaded with a high percentage of filler. Further, their cured products are lowered in the moisture absorption and thermal expansion coefficient of which increases result from the resin itself present in the cured product. Further, a semi-conductor package sealed with the resin composition of the present invention exhibits a high package crack resistance. As above, the resin compositions of the present invention are suitable for use as a sealing material for semi-conductors. Further, the resin composition of the present invention is extensively applicable to other uses requiring a high-percentage loading of filler.

What is claimed is:

1. A semi-conductor package obtained by sealing a semi-conductor with a molding composition, and curing the molding composition in the presence of a curing accelerator to form the semi-conductor package, wherein the uncured molding composition contains:

(A) a resin and a filler therein, said filler comprising a globular powder of which the mean particle diameter is not smaller than 0.1 μm and not greater than 1.5 μm (x component), a globular powder of which the mean particle diameter is not smaller than 2 μm and not greater than 10 μm (y component) and a globular powder of which the mean particle diameter is not smaller than 20 μm and not greater than 70 μm (z component), wherein proportions of the x, y and z components based on the total volume of x, y and z components are not smaller than 10% by volume and not greater than 24% by volume, not smaller than 0.1% by volume and not greater than 30% by volume and not smaller than 57% by volume and not smaller than 76% by volume, respectively; or (B) a resin and a filler therein, said filler comprising a globular powder of which mean particle diameter is not smaller than 0.1 μm and not greater than 1.5 μm (x component), a globular powder of which the mean particle diameter is not smaller than 2 μm and not greater than 10 μm (y component), a globular powder of which mean particle diameter is not smaller than 20 μm and not greater than 70 μm (z component), and a crushed powder (m component), wherein proportions of the x, y and z components based on the total volume of x, y and z components are not smaller than 10% by volume and not greater than 24% by volume, not smaller than 0.1% by volume and not greater than 30% by volume and not smaller than 57% by volume and not greater than 76% by volume, respectively, and a proportion of the m component is not smaller than 1% by weight and not greater than 30% by weight based on the total weight of x, y, z and m components.

2. The semi-conductor package of claim 1, wherein the curing accelerator is used in an amount from 0.1 to 10 parts by weight of curing accelerator per 100 parts by weight of resin.

3. The semi-conductor package of claim 1, wherein in said sealing and curing, a curing agent used in a curing agent-to-resin ratio from 0.7 to 1.2.

4. The semi-conductor package of claim 1, wherein the resin of said uncured molding composition is an imide resin, an epoxy resin, or a combination of both.

5. The semi-conductor package of claim 4, wherein the epoxy resin has a melt viscosity at 150° C. from 1 poise to 20 poise.

6. The semi-conductor package of claim 5, wherein the uncured molding composition further comprises another epoxy resin which has a melt viscosity at 150° C. lower than 1 poise.

7. The semi-conductor package of claim 4, wherein the imide resin is a maleimide compound.

8. The semi-conductor package of claim 4, wherein the uncured molding composition contains an epoxy resin and an imide resin, said imide resin comprising maleimide compound, wherein said uncured molding composition contains said epoxy resin and said maleimide compound in a ratio of 2 to 900 parts by weight of the epoxy resin per 100 parts by weight of the maleimide compound.

9. The semi-conductor package of claim 7, wherein the uncured molding composition contains filler in an amount of not less than 50% by weight and not greater than 95% by weight bases on total weight of the uncured molding composition.

10. The semi-conductor package of claim 4, wherein the uncured molding composition further comprises an alkenyl compound.

11. The semi-conductor package according to claim 2, wherein the curing accelerator is used in an amount from 0.5 to 3 parts by weight of curing accelerator per 100 parts by weight of resin.

12. A semi-conductor package obtained by sealing a semi-conductor with a molding composition, wherein the uncured molding composition contains:

(A) a resin and a filler therein, said filler comprising a globular powder of which the mean particle diameter is not smaller than 0.1 μm and not greater than 1.5 μm (x component), a globular powder of which the mean particle diameter is not smaller than 2 μm and not greater than 10 μm (y component) and a globular powder of which the mean particle diameter is not smaller than 20 μm and not greater than 70 μm (z component), wherein proportions of the x, y and z components based on the total volume of x, y and z components are not smaller than 10% by volume and not greater than 24% by volume, not smaller than 0.1% by volume and not greater than 30% by volume and not smaller than 57% by volume and not greater than 76% by volume, respectively; or (B) a resin and a filler therein, said filler comprising a globular powder of which mean particle diameter is not smaller than 0.1 μm and not greater than 1.5 μm (x component), a globular powder of which the mean particle diameter is not smaller than 2 μm and not greater than 10 μm (y component), a globular powder of which mean particle diameter is not smaller than 20 μm and not greater than 70 μm (z component), and a crushed powder (m component), wherein proportions of the x, y and z components based on the total volume of x, y and z components are not smaller than 10% by volume and not greater than 24% by volume, not smaller than 0.1% by volume and not greater than 30% by volume and not smaller than 57% by volume and not greater than 76% by volume, respectively, and a proportion of the m component is not smaller than 1% by weight and not greater than 30% by weight based on the total weight of x, y, z and m components; and wherein said sealing, a curing agent and a curing accelerator for said molding resin are used.

13. The semi-conductor package of claim 12, wherein the curing accelerator is used in an amount from 0.1 to 10 parts by weight of curing accelerator per 100 parts by weight of resin.

14. The semi-conductor package of to claim 12, wherein said curing accelerator is used in an amount from 0.5 to 3 parts by weight of curing accelerator per 100 parts by weight of resin.

15. The semi-conductor package of claim 12, wherein the curing agent is used in a curing agent-to-resin ratio from 0.7 to 1.2.

16. The semi-conductor package of claim 12, wherein the resin of said uncured molding composition is an imide resin, an epoxy resin, or a combination of both.

17. The semi-conductor package of claim 16, wherein the epoxy resin has a melt viscosity at 150° C. from 1 poise to 20 poise.

18. The semi-conductor package of claim 17, wherein the uncured molding composition further comprises another epoxy resin which has a melt viscosity at 150° C. lower than 1 poise.

19. The semi-conductor package of claim 16, wherein the imide resin is a maleimide compound.

20. The semi-conductor package of claim 16, wherein the uncured molding composition contains an epoxy resin and an imide resin, said imide resin comprises a maleimide compound, and said uncured molding composition contains said epoxy resin and said maleimide compound in a ratio of 2 to 900 parts by weight of the epoxy resin per 100 parts by weight of the maleimide compound.

21. The semi-conductor package of claim 19, wherein the uncured molding composition contains filler in an amount of not less than 50% by weight and not greater than 95% by weight based on the total weight of the uncured molding composition.

22. The semi-conductor package of claim 15, wherein the uncured molding resin composition further comprises an alkenyl compound.

23. The semi-conductor package of claim 16, wherein the curing accelerator is used in an amount from 0.5 to 3 parts by weight of curing accelerator per 100 parts by weight of resin.

24. The semi-conductor package of claim 23, wherein the resin of said uncured molding composition comprises an imide resin, an epoxy resin or a combination of both.

25. The semi-conductor package of claim 24, wherein said curing accelerator is used in an amount of 0.1 to 13 parts by weight per 100 parts by weight of resin.

* * * * *